(12) United States Patent
Pottlapelli et al.

(10) Patent No.: US 10,055,448 B2
(45) Date of Patent: Aug. 21, 2018

(54) TECHNIQUES TO REDUCE CONTENTION WINDOWS

(71) Applicant: Oracle International Corporation, Redwood Shores, CA (US)

(72) Inventors: Murali Pottlapelli, Chino, CA (US); Yogesh Kumar, Sunnyvale, CA (US); Philippe Le Mouel, Seattle, WA (US); David Craft, Portland, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 439 days.

(21) Appl. No.: 14/675,456

(22) Filed: Mar. 31, 2015

(65) Prior Publication Data

US 2016/0070747 A1 Mar. 10, 2016

Related U.S. Application Data

(60) Provisional application No. 62/047,552, filed on Sep. 8, 2014.

(51) Int. Cl.
*G06F 7/00* (2006.01)
*G06F 17/00* (2006.01)
*G06F 17/30* (2006.01)

(52) U.S. Cl.
CPC .. *G06F 17/30377* (2013.01); *G06F 17/30362* (2013.01); *G06F 17/30371* (2013.01)

(58) Field of Classification Search
None
See application file for complete search history.

(56) References Cited

U.S. PATENT DOCUMENTS

| | | | | |
|---|---|---|---|---|
| 7,095,732 | B1* | 8/2006 | Watson, Jr. | H04L 12/5695 370/346 |
| 2005/0177716 | A1* | 8/2005 | Ginter | G06F 21/10 713/157 |
| 2007/0283322 | A1* | 12/2007 | Hsu | G06F 8/34 717/113 |
| 2008/0172607 | A1* | 7/2008 | Baer | G06F 17/2211 715/255 |
| 2010/0088676 | A1* | 4/2010 | Yuan | G06F 17/2288 717/120 |
| 2011/0055299 | A1* | 3/2011 | Phillips | G06F 9/45533 707/827 |
| 2014/0379647 | A1* | 12/2014 | Smith | G06F 17/30174 707/624 |

* cited by examiner

*Primary Examiner* — Tuan A Pham
(74) *Attorney, Agent, or Firm* — Kilpatrick Townsend & Stockton LLP (57) ABSTRACT

Embodiments of the present invention provide improved concurrency by reducing the time period (also referred to herein as a locking window or contention window) during which a record is locked. This provides the benefits of pessimistic locking schemes by preventing transaction due to concurrent updates, while also reducing the time during which a record is exclusively locked. This improves user experience and performance.

15 Claims, 7 Drawing Sheets

TECHNIQUES TO REDUCE CONTENTION WINDOWS

CROSS-REFERENCES TO RELATED APPLICATIONS

The present application is a non-provisional application of and claims the benefit and priority under 35 U.S.C. 119(e) of U.S. Provisional Application No. 62/047,552 filed Sep. 8, 2014, entitled "TECHNIQUES TO REDUCE DATABASE RECORD CONTENTION WINDOW," the entire contents of which are incorporated herein by reference for all purposes

BACKGROUND

The present disclosure relates generally to computer systems and software, and more particularly to techniques for reducing contention windows in computing environments.

In the database world, there are two common types of locking that are performed on database records that can be accessed and updated by more than one user: optimistic locking and pessimistic locking. These locking techniques are used to avoid data that has been updated by multiple users from going into an inconsistent state. In pessimistic locking, when a first user accesses a record, the record goes into a lock state. Any other user who attempts to access the record will be prevented from accessing it until the first user's action completes. For optimistic locking, the system lets multiple users access the record. If only one user updates the record, then there is no conflict and no delay was incurred by either user. In situations where both users attempt to update the record, the system can commit the first update it receives, mark the database record as updated, and reject any subsequent updates that are received to an out of date record.

Both locking schemes present problems that lead to a poor user experience. In pessimistic locking, users are delayed in performing actions. These delays may not be acceptable in time sensitive applications. Optimistic locking can reduce delays, but when a conflict is detected, the user may be forced to start over and make all of their changes again to the updated object. Embodiments of the invention address these and other problems.

BRIEF SUMMARY

Embodiments of the present invention provide improved concurrency by reducing the time period (also referred to herein as a locking window or contention window) during which a record is locked. This provides the benefits of pessimistic locking schemes by preventing transaction due to concurrent updates, while also reducing the time during which a record is exclusively locked. This improves user experience and performance.

In some embodiments, a method of reducing contention windows can comprise storing a first copy of data from a data store. A request can be received to update the first copy of the data. A second copy of the data based on the requested update, can be stored and a request to commit the update to the data can be received. A request can be sent to the data store to lock the data, and a third copy of the data can be retrieved from the data store. A three-way merge can then be executed on the record.

In some embodiments, the three-way merge can comprise determining a difference between the first copy of the data and the second copy of the data, adding the difference to the third copy of the data to create a merged copy of the data, and storing the merged copy of the data. In some embodiments, the method can further comprise committing the merged copy of the data to the data store, and sending a request to the data store to release the lock on the data.

In some embodiments, the third copy of the data from the data store includes one or more updates committed after the first copy of the data was stored and before request to lock the data was sent. In some embodiments, the second copy of the data corresponds to first copy of the data including the requested update. In some embodiments, the data store is a database and the data is one or more database records. In some embodiments, the data store is an object store accessible to a plurality of threads, and wherein the data is one or more mutable objects.

Embodiments of the present invention can include a system to reduce contention windows. The system can include a resource management system, including a data store and a transaction manager. The resource management system is configured to store data and manage access to the data from a plurality of client devices. The system can also include a gateway computer that is configured to receive requests from the plurality of client devices, to access the resource management system. When a data request is received from a client device, the gateway computer is configured to store a first copy of the requested data from the data store, receive a request from the client device to update the first copy of the data, store a second copy of the data based on the requested update, receive a request from the client device to commit the update to the data in the resource management system, send a request to the data store to lock the data, retrieve a third copy of the data from the data store, and execute a three-way merge on the record.

Embodiments of the present invention can include a non-transitory computer readable storage medium including instructions stored thereon which, when executed by a processor, cause the processor to perform a method comprising storing a first copy of data from a data store, receiving a request to update the first copy of the data, storing a second copy of the data based on the requested update, receiving a request to commit the update to the data, sending a request to the data store to lock the data, retrieving a third copy of the data from the data store, and executing a three-way merge on the record.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Embodiments of the present invention provide improved concurrency by reducing the time period (also referred to herein as a locking window or contention window) during which a record is locked. This provides the benefits of pessimistic locking schemes by preventing transaction due to concurrent updates, while also reducing the time during which a record is exclusively locked. This improves user experience and performance.

Figure 1:
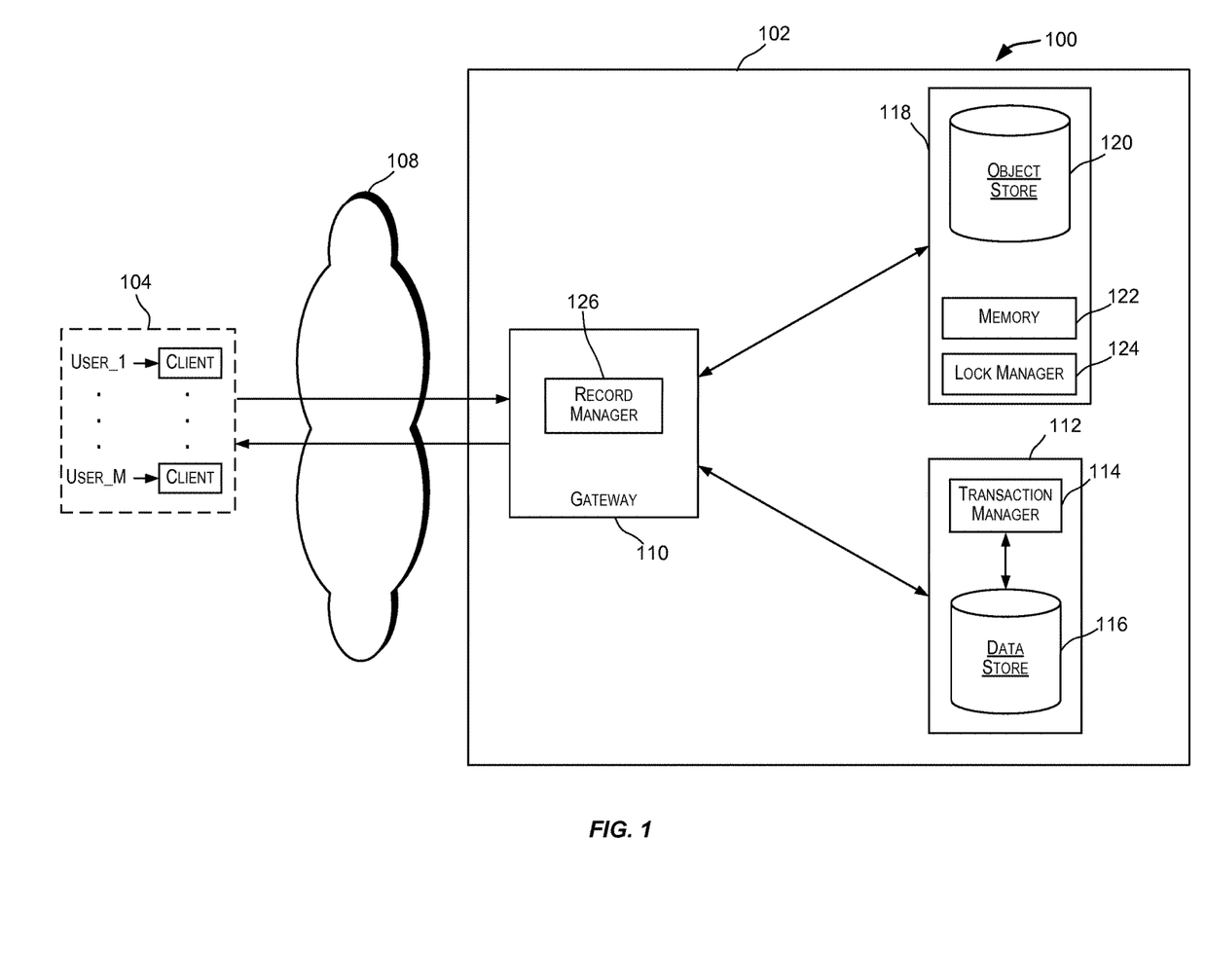
FIG. 1 illustrates a high level diagram of a system for reducing contention windows, in accordance with an embodiment of the present invention.

FIG. 1 illustrates a high level diagram of a system for reducing contention windows, in accordance with an embodiment of the present invention. As shown, network environment 100 comprises multiple client devices 104 communicatively coupled to a resource management system 102 via a communication network 108. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

The client devices may be of various different types, including, but not limited to personal computers, desktops, mobile or handheld devices such as a laptop, a mobile phone, a tablet, etc., and other types of devices. Communication network 108 facilitates communications between client devices 104 and resource management system 102. Communication network 108 can be of various types and can include one or more communication networks. Examples of communication network 108 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 108 may include any communication network or infrastructure that facilitates communications between clients and adaptive webpages system 102.

In some embodiments, clients 104 can request access to data stored in resource management system 102 through a gateway 110. Gateway 110 can manage data access requests (e.g., create, read, update, and delete requests) for data stored in a plurality of different data storage systems associated with resource management system 102. For example, in some embodiments, gateway 110 can receive requests for data stored in a data management system 112 which may include a transaction manager 114 and a data store 116 (e.g., a database, cloud-based storage service, or other data store). In some embodiments, gateway 110 can manage requests for data stored in a shared data system 118, which may include an object store 120, memory 122 (e.g., a cache associated with object store 120) and a lock manager 124. In some embodiments, a single gateway 110 may manage access to each data storage system 112, 118. In some embodiments, each data storage system 112, 118 may be managed by a different gateway 110.

As described further below with respect to FIGS. 2-3, when gateway 110 receives a data access request from a client 104, the gateway 110 can store a copy of the requested data in a record manager 126. In some embodiments, record manager 126 can maintain multiple copies of the requested data including an original copy of the data (e.g., representing the state of the requested data when it was initially requested) and a clone copy of the data (e.g., representing an updated state of the requested data which reflects changes to the data requested by the client). When the gateway receives a request to commit the changes made to the requested data (e.g., to store the updated data in the data store 116 or object store 120), a current copy of the data (e.g., representing the state of the requested data when commit is requested) can be retrieved by gateway 110 and stored by record manager 126. Record manager 126 may then execute a three-way merge algorithm, as described further below, to create a merged copy of the requested data which may then be committed. Access to the requested data may be locked at commit, instead of being locked during the entire transaction, reducing the contention window of the requested data and improving system performance.

Figure 2:
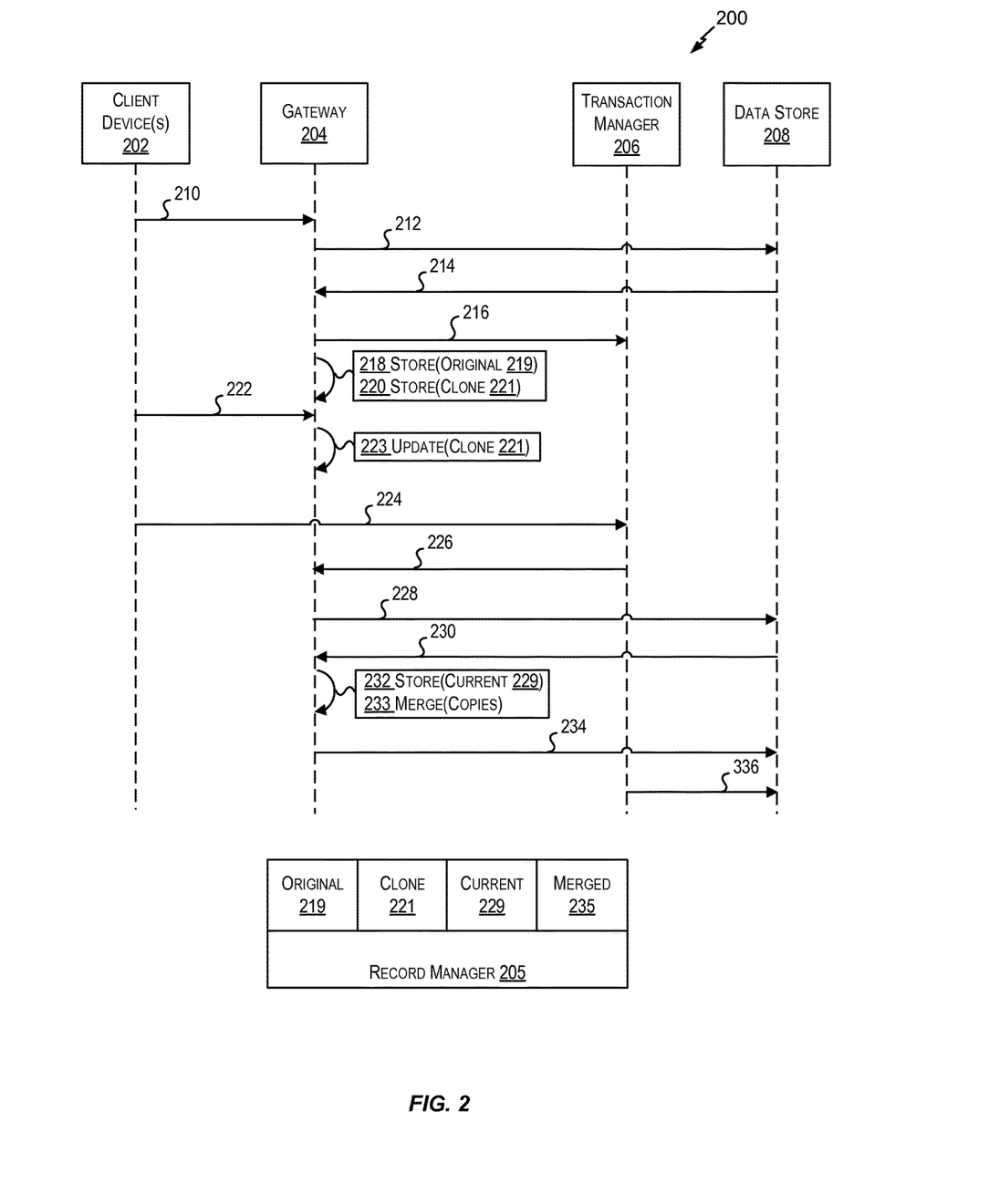
FIG. 2 illustrates a sequence diagram of a method of reducing a database record contention window, in accordance with an embodiment of the present invention.

FIG. 2 illustrates a sequence diagram 200 of a method of reducing a database record contention window, in accordance with an embodiment of the present invention. As described above, optimistic locking schemes provide improved concurrency by allowing multiple users to access the same record, but in the event there are concurrent updates, only one of the updates is committed while the other updates are failed, resulting in transaction rollback and a poor user experience. In pessimistic locking schemes, a record is locked at the beginning of a transaction, preventing transaction rollback due to concurrent modification by preventing concurrent access, also resulting in poor performance. Embodiments of the present invention provide improved concurrency of database tables that need highly concurrent access, but cannot work with optimistic locking schemes.

Embodiments of the present invention provide improved concurrency by reducing the time period (also referred to herein as a locking window or contention window) during which a record is locked. This provides the benefits of pessimistic locking schemes by preventing transaction rollback due to concurrent updates, while also reducing the time during which a record is exclusively locked. This improves user experience and performance.

As shown in FIG. 2, a client device 202 can send a request 210 to access data in data store 208 through a gateway 204. In some embodiments, request 210 can include an identifier corresponding to the requested record. In some embodiments, request 210 can include access information (e.g., credential data) corresponding to a user of client device 202. The access information can be used by an access management service to determine whether the user is authorized to access the requested data.

In response to request 210, gateway 204 can generate and send a request 212 access to the requested data from the data store 208. Gateway 204 can receive 214 the requested data from data store 208 and store and send a request 216 to register with a transaction listener of a transaction manager 206. Gateway 204 can include a record manager 205 that stores 218 a first copy 219 of the requested data and stores 220 a second copy 221 of the requested data. The first copy of the requested data is referred to herein as the original 219 copy of the requested data and the second copy 221 is referred to herein as the clone 221 of the requested data. In some embodiments, the gateway can provide access to the clone 221 to the client 202 while not allowing access to the original 219.

In some embodiments, the client can then perform updates 223 to the clone record 221. During this time, the requested data in data store 208 is not locked, reducing the contention window. The updates 223 can be made by the client device 202 to the clone copy 221, without making changes to the original copy 219. This allows the differences between the clone copy 221 and the original copy 219 to be determined during commit, as described further below.

When the client device 202 is finished updating the record, client 202 can send a request 224 to transaction manager 206 to commit the changes made to the requested data to data store 208. In response, transaction manager 206 can send 226 a message to gateway 204 to enter a precommit phase to begin the commit process. During the precommit phase, gateway 204 requests 228 a third copy 229 of the requested data from data store 208 and obtains a lock for the requested data in the data store. The third copy represents the "current" (e.g., at the time of request 228) state of the requested data. Because the requested data had not been locked during the time between the initial data request 210 and the lock request 228, changes may have been made to the requested data by other client devices. In response, the current copy of the requested data is received 230 by the gateway from the data store 208 and the requested data is locked. In some embodiments, the lock can be managed by transaction manager 206. In some embodiments, data store 208 may be associated with a lock manager configured to manage locks for records stored in data store 208. Gateway 204 can then store 232 the current copy 229 of the requested data in record manager 205 (e.g., record manager 116).

In some embodiments, to account for any potential changes to the requested data, gateway 204 can execute a three way merge 233 the three versions of the requested data maintained by the gateway 204: the original copy 219, the clone copy 221 (including any changes made by client device 202), and the current copy 229 (representing the current state of the requested data at the time it is locked). In some embodiments, record manager 205 can execute the three way merge by determining a difference between clone copy 221 and original copy 219. The difference can then be merged with the current copy 229 to produce merged copy 235. Merged copy 235 includes the changes made to clone copy 221 (corresponding to the difference between clone copy 221 and original copy 219) as well as any intervening changes made by other client devices (as reflected in current copy 229). Merged copy 235 may then be committed to the data store 208. Using this method, the requested data is exclusively locked starting at the precommit and released at commit, reducing the contention window for the requested data.

Because embodiments of the present invention do not lock the record being updated until precommit, rather than for the entire transaction, the time any given record is locked can be reduced. To account for any changes that may have been introduced prior to the record being locked, the gateway can retrieve the current state of the record when the lock is requested.

In some embodiments, the data being updated can include an instance count, or other counter value. When new instances are generated the instance count can be incremented. During a merge, the instance count between the different versions can represent the changed value of the record. Thus, when the difference between the clone copy 221 and the original copy 219 is calculated, the difference represents the difference between the instance counts in each record. This can be represented as an integer value. Similarly, the current copy 229 can also include an instance count. The instance count of the current copy 229 may vary from the instance count of the original copy 219 and the clone copy 221 due to the lack of locking (e.g., other users may have accessed the record in the intervening period and the instance count may have incremented accordingly). When the difference in instance counts between the clone copy 221 and the original copy 219 are added to the current copy 229, a new record representing the merged copy 235 is created. Although embodiments of the present invention are described with respect to merging different counter values, this is provided for simplicity of explanation. Alternative record values may also be similarly reconciled using a three way merge. In some embodiments, a user can be prompted to select a value that represents the intended merge value where multiple merged values are possible.

Figure 3:
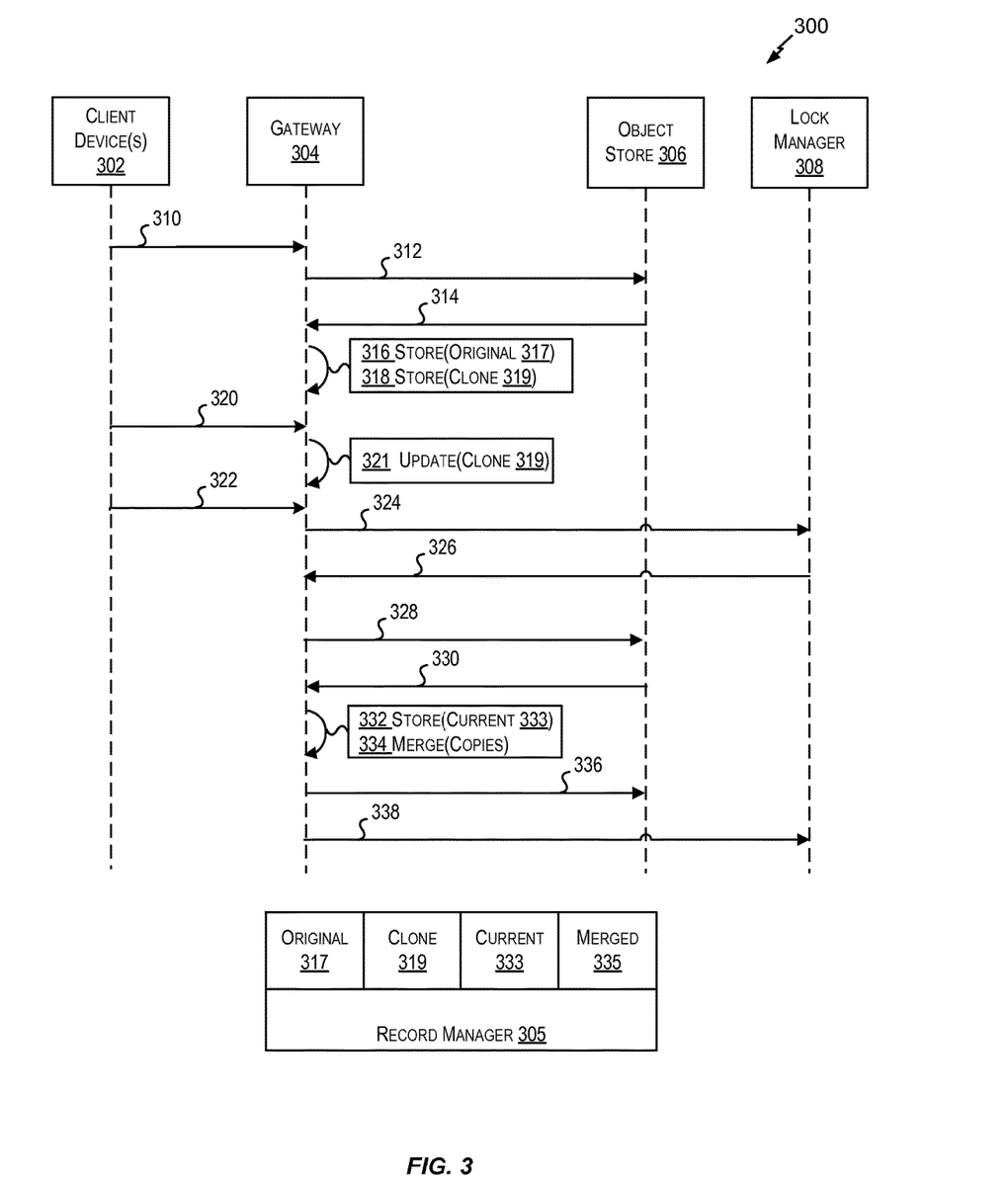
FIG. 3 illustrates a sequence diagram of a method of reducing a memory contention window, in accordance with an embodiment of the present invention.

FIG. 3 illustrates a sequence diagram of a method 300 of reducing a memory contention window, in accordance with an embodiment of the present invention. In some embodiments, a similar locking scheme to that described above with respect to FIG. 2 can be used in other computing contexts. For example, thread safety is a computer programming concept applicable in the context of multi-threaded programs. A piece of code can be referred to as being thread-safe if it manipulates shared data structures in a manner that guarantees safe execution by multiple threads at the same time (e.g., where a thread does not overwrite other thread's updates). One way of providing thread safety access to mutable objects is by using locks that ensure only one thread reads or writes to the shared data at any time. Like the pessimistic locking schemes in the database context described above, this limits concurrency.

Embodiments of the present invention facilitate multiple threads working on a mutable object while providing thread safety. In some embodiments, the access to managed objects can be controlled via a gateway. A client can request an object (e.g., by query or object identifier), perform state changes on the object (one or more set operations), and update the object (commit).

Multiple versions of the objects can be managed by the gateway. The gateway can keep track of the version of object it is servicing for a given request. On update, the gateway can acquire a lock, perform a three-way merge between the new client-updated version, the original version as it existed when the client first requested the object, and the latest version of the object at the gateway (which may have been modified by another client during time window between request and update). The resulting merged version is set as latest version and lock is released. In some embodiments, a client can register a three-way merge method per type, which can override built-in merge mechanisms.

As shown in FIG. 3, a client device 302 can request objects stored in object store 306 via gateway 304. Client device 302 can send a request 310 for an object stored in object store 306. The request can be received by gateway 304. Gateway 304 can send a request 312 to object store 306 to retrieve an "original" copy of the object. In response to request 312, object store 306 can return 314 the original copy of the object. Gateway 304 may then store 316 the original copy 317 locally at gateway 304 (e.g., in record manager 305). Gateway 304 may also store 318 a "clone" copy 319 of the requested object in record manager 305. When requests are received from client device 302 to modify the requested object (e.g., request 320) gateway 304 can update 321 the clone copy 319 with those modifications. This enables gateway 304 to maintain both the original 317 state of the object as well as the modified clone copy 319 of the object.

When the client sends a request 322 to commit the changes made to the requested object, gateway 304 can send a request 324 to lock manager 308 to lock the object in object store 306. Lock manager 308 can verify that the object is not currently locked, and return 326 a lock to gateway 304. In the event more than one thread (e.g., client) requests commit at the same time, one of them would continue, while others wait on lock. Gateway 304 may then request 328 a current copy of the object from object store 306, which returns 330 the current copy of the object. Gateway 304 can store 332 the current copy 333 in record manager 305. In some embodiments, record manager 305 can execute a three way merge 334 of the stored copies of the object 317, 319, 333 by determining a difference between clone copy 319 and original copy 317. The difference can then be merged with the current copy 333 to produce merged copy 335. Merged copy 335 includes the changes made to clone copy 319 (corresponding to the difference between clone copy 319 and original copy 317) as well as any intervening changes made by other client devices or threads (as reflected in current copy 333). Merged copy 335 may then be committed to the object store 306. Using this method, the requested data is exclusively locked starting at the precommit and released at commit, reducing the contention window for the requested data.

Figure 4:
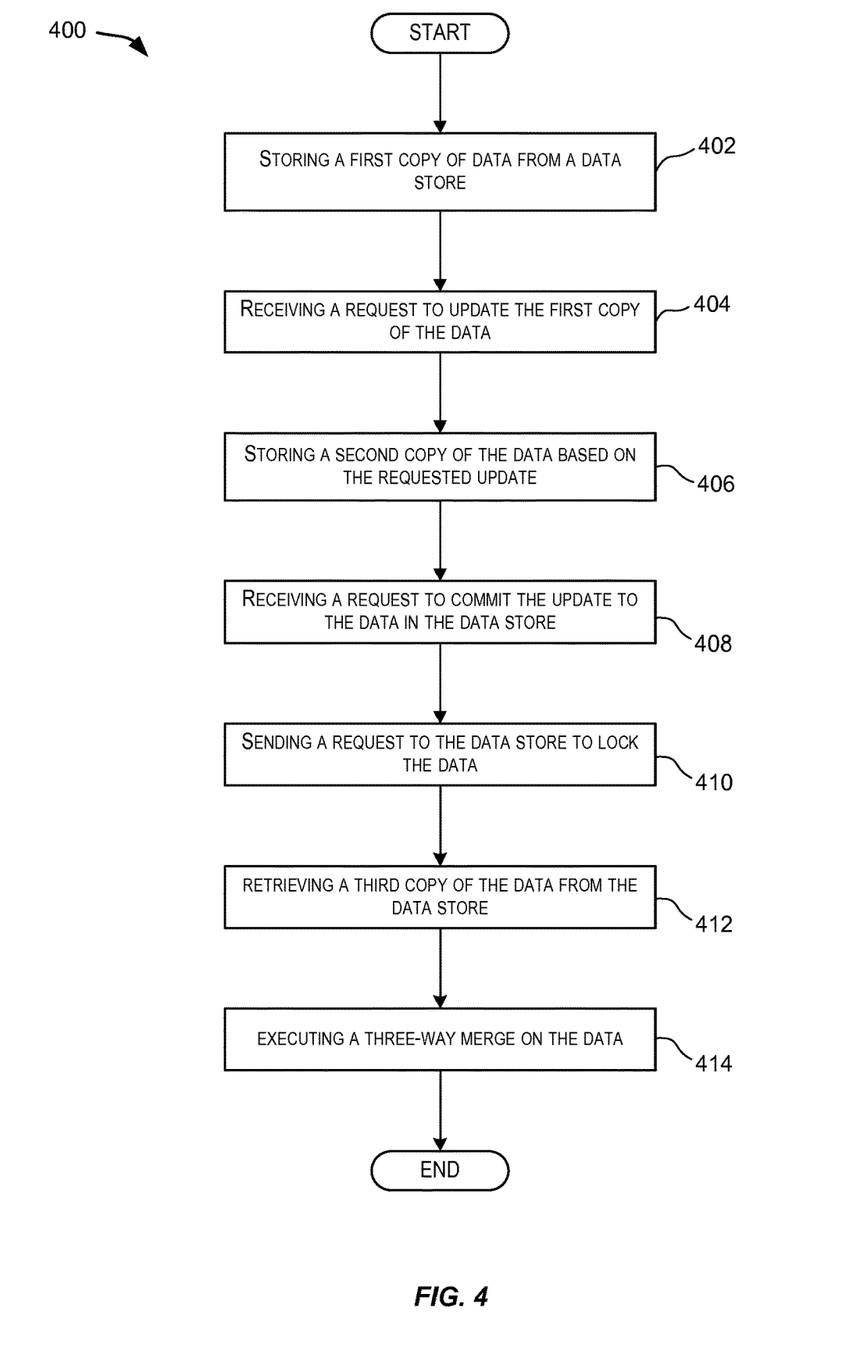
FIG. 4 illustrates a diagram of a method of reducing contention windows, in accordance with an embodiment of the present invention.

FIG. 4 illustrates a diagram of a method 400 of reducing contention windows, in accordance with an embodiment of the present invention. At block 402, a first copy of data from a data store is stored. For example, a client may request access to data stored in a database or other data store. In some embodiments, the data is one or more mutable objects stored in an object store accessible to a plurality of threads. The request may be received by a gateway which retrieves the requested data from the data store and locally stores it at the gateway.

At step 404, a request is received to update the first copy of the data. The request can be received from the client by the gateway. The request can include one or more changes to be made to the data, such as incrementing a counter or otherwise updating the data. At step 406, a second copy of the data can be stored based on the requested update. As a result, the gateway may then maintain two copies of the requested data, the original copy corresponding to the state of the data when it was requested and a clone or update copy reflecting at least one change made to the data at the request of the client.

At step 408, a request to commit the update to the data is received. For example, the client may have completed making updates to the requested data and may then instruct the gateway to store the updated data in the data store. Once a request to commit is received, a precommit phase is entered. At step 410, a request may be sent to the data store to lock the data. At this point the data is locked and other clients (e.g., users, threads, processes, etc.) cannot access the data. At step 412, a third copy of the data is retrieved from the data store. The third copy of the data reflects the current state of the data when the data was locked, reflecting any changes that were made by other clients after the data was originally stored at block 402.

At step 414, a three-way merge is executed on the data. The three-way merge can be executed using the original, clone, and current copies of the data maintained by the gateway. In some embodiments, the three way merge can include determining a difference between the first copy of the data and the second copy of the data, adding the difference to the third copy of the data to create a merged copy of the data, and storing the merged copy of the data.

In some embodiments, after executing the three-way merge, the merged data can be committed to the data store, and a request can be sent to the data store (or transaction manager, lock manager, or other system) to release the lock on the data.

Figure 5:
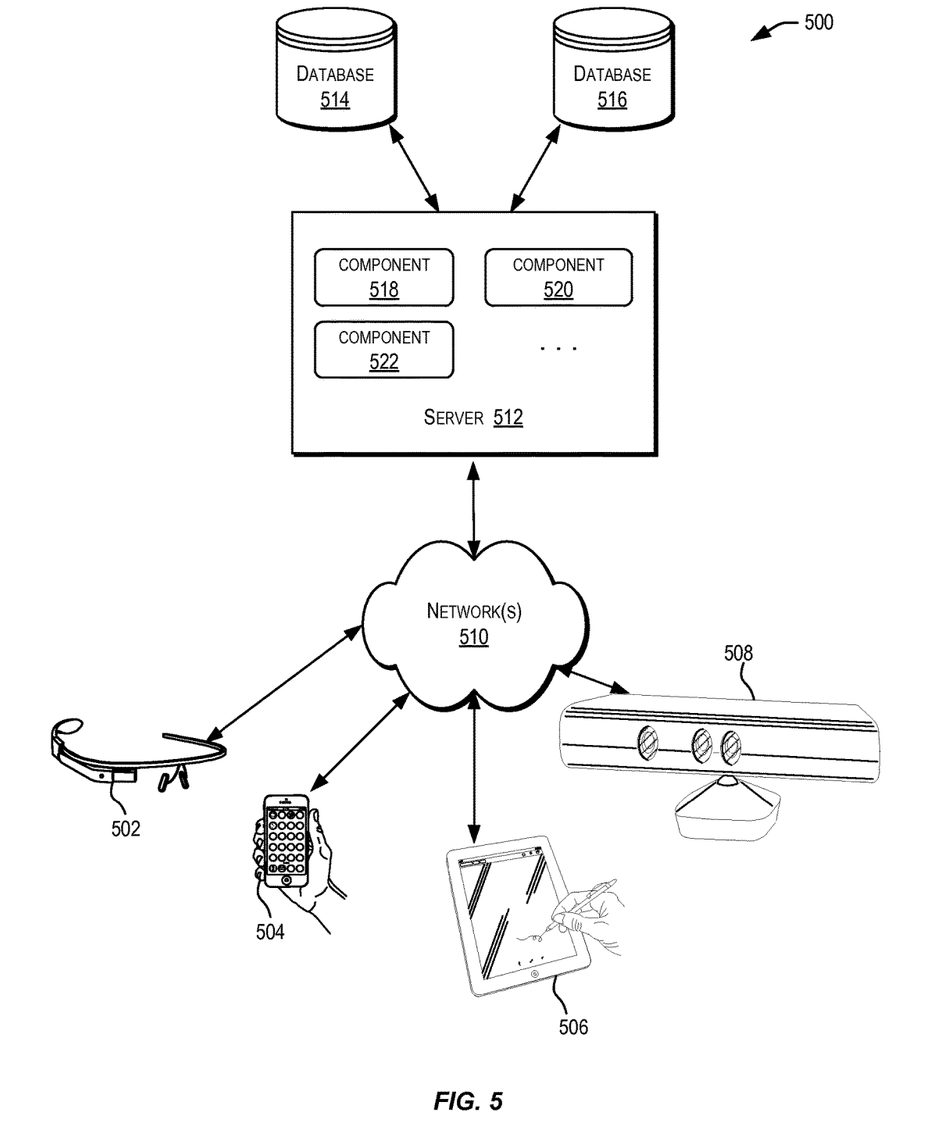
FIG. 5 depicts a simplified diagram of a distributed system for implementing one of the embodiments.

FIG. 5 depicts a simplified diagram of a distributed system 500 for implementing an embodiment. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications such as services and applications that provide the document (e.g., webpage) analysis and modification-related processing. In certain embodiments, server 512 may also provide other services or software applications can include non-virtual and virtual environments. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in FIG. 5 is thus one example of a distributed system for implementing an embodiment system and is not intended to be limiting.

Client computing devices 502, 504, 506, and/or 508 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 5, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 510.

Although distributed system 500 in FIG. 5 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization. One or more flexible pools of logical storage devices can be virtualized to maintain virtual storage devices for the server. Virtual networks can be controlled by server 512 using software defined networking In various embodiments, server 512 may be adapted to run one or more services or software applications described in the foregoing disclosure. For example, server 512 may correspond to a server for performing processing as described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. These databases may provide a mechanism for storing information such as user interactions information, usage patterns information, adaptation rules information, and other information used by embodiments of the present invention. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
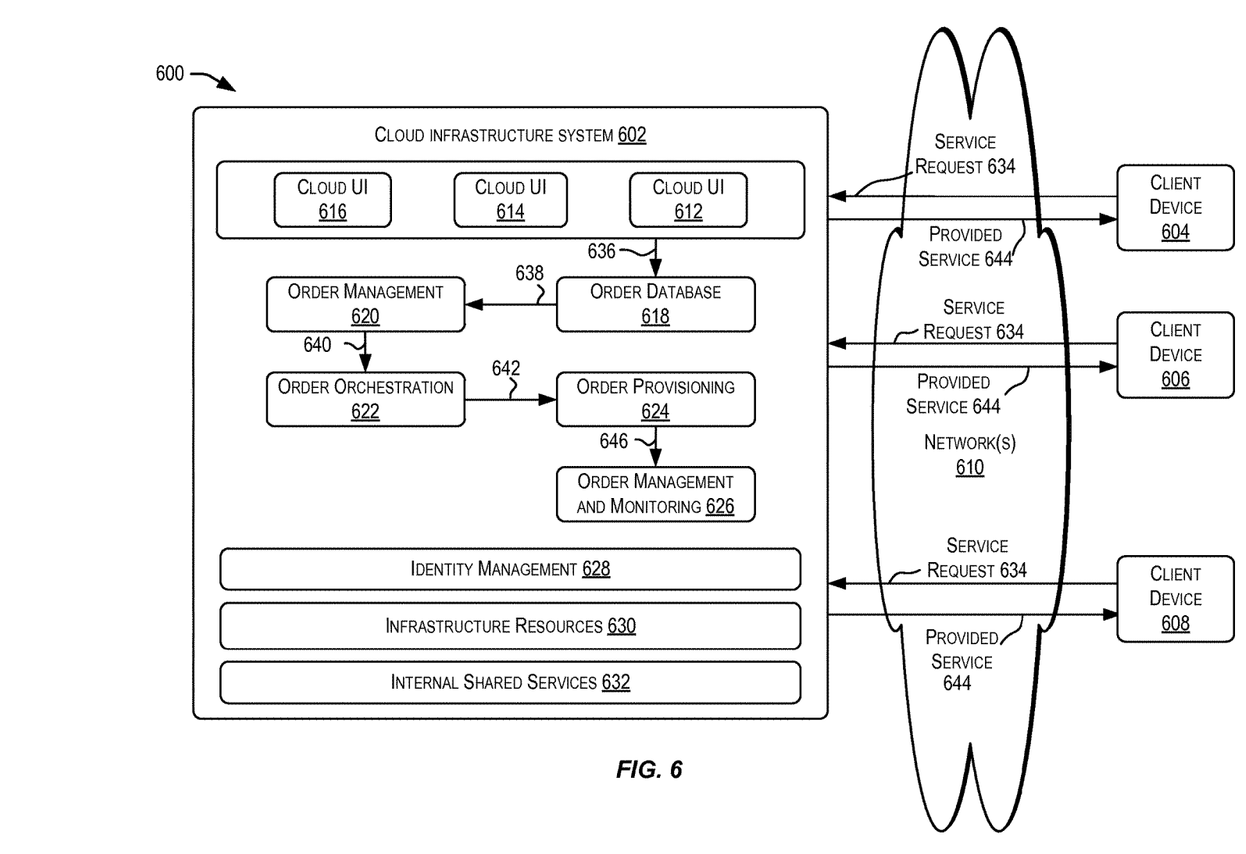
FIG. 6 is a simplified block diagram of components of a system environment by which services provided by the components of an embodiment system may be offered as cloud services, in accordance with an embodiment of the present disclosure.

In some embodiments, the document analysis and modification services described below may be offered as services via a cloud environment. FIG. 6 is a simplified block diagram of one or more components of a system environment 600 in which services may be offered as cloud services, in accordance with an embodiment of the present disclosure. In the illustrated embodiment in FIG. 6, system environment 600 includes one or more client computing devices 604, 606, and 608 that may be used by users to interact with a cloud infrastructure system 602 that provides cloud services, including services for dynamically modifying documents (e.g., webpages) responsive to usage patterns. Cloud infrastructure system 602 may comprise one or more computers and/or servers that may include those described above for server 512.

It should be appreciated that cloud infrastructure system 602 depicted in FIG. 6 may have other components than those depicted. Further, the embodiment shown in FIG. 6 is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508. Client computing devices 604, 606, and 608 may be configured to operate a client application such as a web browser, a proprietary client application (e.g., Oracle Forms), or some other application, which may be used by a user of the client computing device to interact with cloud infrastructure system 602 to use services provided by cloud infrastructure system 602. Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

In certain embodiments, services provided by cloud infrastructure system 602 may include a host of services that are made available to users of the cloud infrastructure system on demand. In addition to services related to dynamic document modification responsive usage patterns, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 602 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 602 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle Corporation) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform, and other resources.

In some embodiments, resources in cloud infrastructure system 602 may be shared by multiple users and dynamically re-allocated per demand. Additionally, resources may be allocated to users in different time zones. For example, cloud infrastructure system 602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 to enable provision of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in FIG. 6, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In an exemplary operation, at 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI) such as cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

At 636, the order information received from the customer may be stored in an order database 618. If this is a new order, a new record may be created for the order. In one embodiment, order database 618 can be one of several databases operated by cloud infrastructure system 618 and operated in conjunction with other system elements.

At 638, the order information may be forwarded to an order management module 620 that may be configured to perform billing and accounting functions related to the order, such as verifying the order, and upon verification, booking the order.

At 640, information regarding the order may be communicated to an order orchestration module 622 that is configured to orchestrate the provisioning of services and resources for the order placed by the customer. In some instances, order orchestration module 622 may use the services of order provisioning module 624 for the provisioning. In certain embodiments, order orchestration module 622 enables the management of business processes associated with each order and applies business logic to determine whether an order should proceed to provisioning.

As shown in the embodiment depicted in FIG. 6, at 642, upon receiving an order for a new subscription, order orchestration module 622 sends a request to order provisioning module 624 to allocate resources and configure resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. This enables order orchestration module 622 to be isolated from implementation details, such as whether or not services and resources are actually provisioned on the fly or pre-provisioned and only allocated/assigned upon request.

At 644, once the services and resources are provisioned, a notification may be sent to the subscribing customers indicating that the requested service is now ready for use. In some instance, information (e.g. a link) may be sent to the customer that enables the customer to start using the requested services.

At 646, a customer's subscription order may be managed and tracked by an order management and monitoring module 626. In some instances, order management and monitoring module 626 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 600 may include an identity management module 628 that is configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
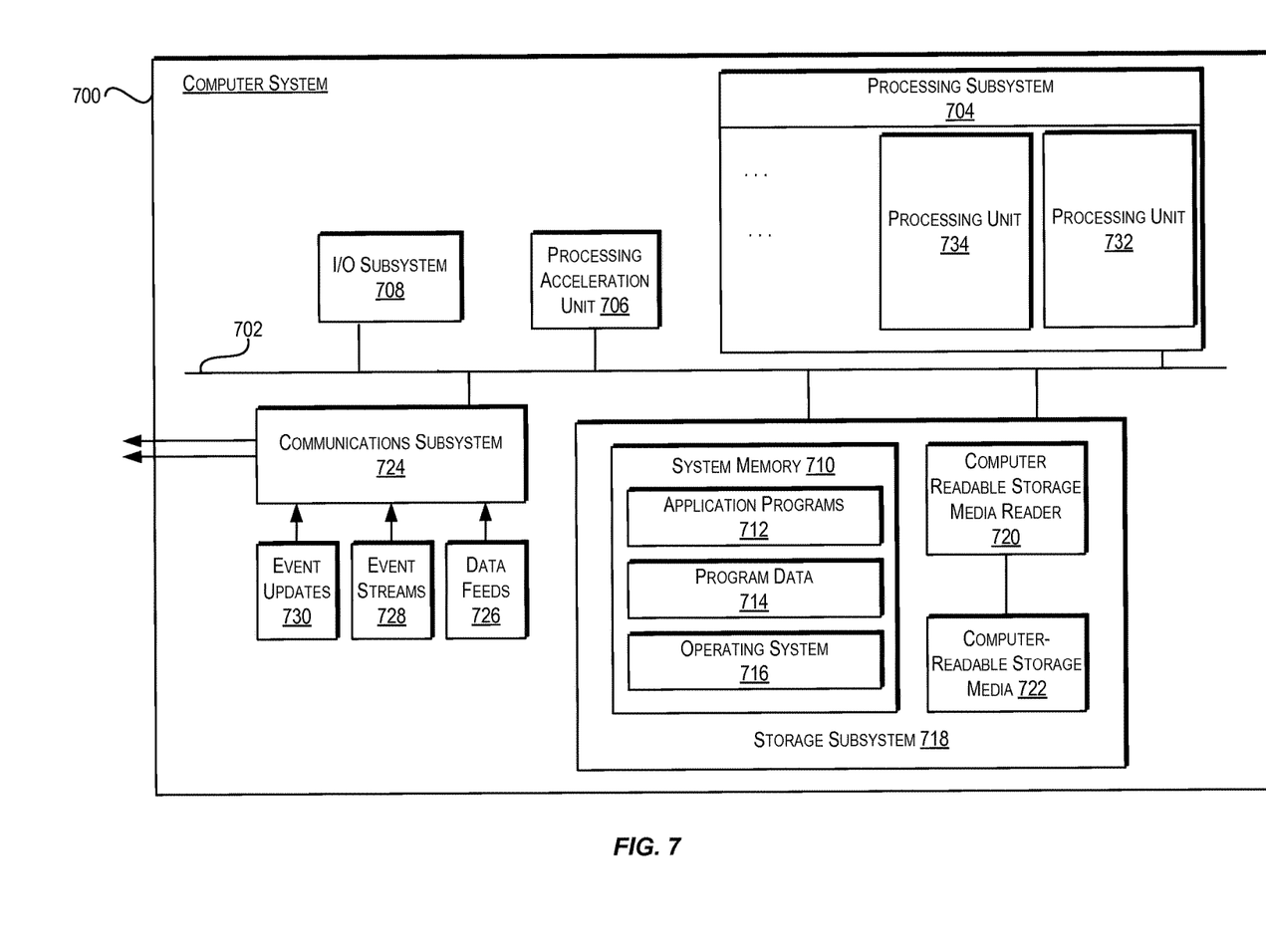
FIG. 7 illustrates an exemplary computer system, in which various embodiments of the present invention may be implemented.

FIG. 7 illustrates an exemplary computer system 700 that may be used to implement an embodiment of the present invention. In some embodiments, computer system 700 may be used to implement any of the various servers and computer systems described above. As shown in FIG. 7, computer system 700 includes various subsystems including a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 may include tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processing units 732, 734, etc. A processing unit may include be one or more processors, including single core or multicore processors, one or more cores of processors, or combinations thereof. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above for dynamically modifying documents (e.g., webpages) responsive to usage patterns.

In certain embodiments, a processing acceleration unit 706 may be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term "input device" is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information that is used by computer system 700. Storage subsystem 718 provides a tangible non-transitory computer-readable storage medium for storing the basic programming and data constructs that provide the functionality of some embodiments. Software (programs, code modules, instructions) that when executed by processing subsystem 704 provide the functionality described above may be stored in storage subsystem 718. The software may be executed by one or more processing units of processing subsystem 704. Storage subsystem 718 may also provide a repository for storing data used in accordance with the present invention.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM) or dynamic random access memory (DRAM).

By way of example, and not limitation, as depicted in FIG. 7, system memory 710 may store application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 722 may store programming and data constructs that provide the functionality of some embodiments. Software (programs, code modules, instructions) that when executed by processing subsystem 704 a processor provide the functionality described above may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 722 may provide storage of computer-readable instructions, data structures, program modules, and other data for computer system 700.

In certain embodiments, storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for storing computer-readable information.

In certain embodiments, computer system 700 may provide support for executing one or more virtual machines. Computer system 700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 700. Accordingly, multiple operating systems may potentially be run concurrently by computer system 700. Each virtual machine generally runs independently of the other virtual machines.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, resource management system 102 depicted in FIG. 1 may receive user interactions information and data requests from client devices using communication subsystem 724.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, communications subsystem 724 may receive input communication in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    storing, in a record manager, a first copy of data obtained from a data store, wherein the first copy of the data is an original copy of the data;
    receiving, by a gateway, a request to update the first copy of the data;
    providing, by the gateway, a second copy of the data which is a clone of the first copy of the data to a client, and wherein the second copy of the data stored in the record manager is unlocked and configured to be editable;
    storing, in the record manager, the second copy of the data based on the requested update;
    receiving a request to commit the update to the data;
    in response to receiving the request to commit the update to the data, sending a request to the data store to lock the data stored in the data store;
    in response to receiving the request to lock the data, locking the data that is currently stored in the data store;
    retrieving a third copy of the data from the data store, wherein the third copy of the data is a current copy of the data, wherein the third copy of the data from the data store includes one or more updates committed after the first copy of the data was stored and before request to lock the data was sent;
    storing, in the record manager, the third copy of the data;
    merging, by the record manager, the first copy of the data, the second copy of the data, and the third copy of the data in a three-way merge,
    wherein the three-way merge comprises:
        determining a difference between the first copy of the data and the second copy of the data; and
        adding the difference to the third copy of the data to create a merged copy of the data, wherein the merged copy includes changes made to the second copy of the data;
    committing the merged copy of the data to the data store; and
    sending a request to the data store to release the lock on the data in order to reduce a contention window for the data.

2. The method of claim 1, wherein the second copy of the data corresponds to first copy of the data including the requested update.

3. The method of claim 1, wherein the data store is a database and the data is one or more database records.

4. The method of claim 1, wherein the data store is an object store accessible to a plurality of threads, and wherein the data is one or more mutable objects.

5. The method according to claim 1, further comprising:
sending the merged copy to the data store; and
updating the data stored in the data store in accordance with the merged copy.

6. The method according to claim 1, wherein the data in the data store comprises an instance counter value, and in response to an instance of the data being generated, incrementing an instance counter value for the data.

7. The method according to claim 6, wherein the merging comprises comparing instance counter values of the first copy of the data, the second copy of the data and the third copy of the data.

8. The method according to claim 1, wherein locking the data that is currently stored in the data store comprising preventing one or more users from editing the data currently stored in the data store.

9. A system comprising:
a resource management system comprising a processor and a memory, including a data store and a transaction manager, wherein the resource management system is configured to store data and manage access to the data from a plurality of client devices; and
a gateway computer, wherein the gateway computer is configured to receive requests from the plurality of client devices, to access the resource management system, wherein when a data request is received from a client device, the gateway computer is configured to:
store, in a record manager, a first copy of the requested data from the data store, wherein the first copy of the data is an original copy of the data;
receive a request from the client device to update the first copy of the data;
provide a second copy of the data which is a clone of the first copy of the data to a client, and wherein the second copy of the data stored in the record manager is unlocked and configured to be editable;
store, in the record manager, the second copy of the data based on the requested update;
receive a request from the client device to commit the update to the data in the resource management system;
in response to receiving the request to commit the update to the data, send a request to the data store to lock the data stored in the data store;
in response to receiving the request to lock the data, locking the data that is currently stored in the data store;
retrieve a third copy of the data from the data store, wherein the third copy of the data is a current copy of the data,
wherein the third copy of the data from the data store includes one or more updates committed after the first copy of the data was stored and before request to lock the data was sent;
store, in the record manager, the third copy of the data;
merge, by the record manager, the first copy of the data, the second copy of the data, and the third copy of the data in a three-way merge;
wherein the three-way merge comprises:
determining a difference between the first copy of the data and the second copy of the data; and
adding the difference to the third copy of the data to create a merged copy of the data, wherein the merged copy includes changes made to the second copy of the data;
committing the merged copy of the data to the data store; and
sending a request to the data store to release the lock on the data in order to reduce a contention window for the data.

10. The system of claim 9, wherein the second copy of the data corresponds to first copy of the data including the requested update.

11. The system of claim 9, wherein the data store is a database and the data is one or more database records.

12. The system of claim 9, wherein the data store is an object store accessible to a plurality of threads, and wherein the data is one or more mutable objects.

13. A non-transitory computer readable storage medium including instructions stored thereon which, when executed by a processor, cause the processor to perform a method comprising:
storing, in a record manager, a first copy of data from a data store, wherein the first copy of the data is an original copy of the data;
receiving, by a gateway, a request to update the first copy of the data;
providing, by the gateway, a second copy of the data which is a clone of the first copy of the data to a client, and wherein the second copy of the data stored in the record manager is unlocked and configured to be editable; storing, in the record manager, the second copy of the data based on the requested update;
receiving a request to commit the update to the data;
in response to receiving the request to commit the update to the data, sending a request to the data store to lock the data stored in the data store;
in response to receiving the request to lock the data, locking the data that is currently stored in the data store;
retrieving a third copy of the data from the data store, wherein the third copy of the data is a current copy of the data,
wherein the third copy of the data from the data store includes one or more updates committed after the first copy of the data was stored and before request to lock the data was sent;
storing, in the record manager, the third copy of the data;
merging, by the record manager, the first copy of the data, the second copy of the data, and the third copy of the data in a three-way merge;
wherein the three-way merge comprises:
determining a difference between the first copy of the data and the second copy of the data; and
adding the difference to the third copy of the data to create a merged copy of the data, wherein the merged copy includes changes made to the second copy of the data;
committing the merged copy of the data to the data store; and
sending a request to the data store to release the lock on the data in order to reduce a contention window for the data.

14. The non-transitory computer readable storage medium of claim 13, wherein the second copy of the data corresponds to first copy of the data including the requested update.

15. The non-transitory computer readable storage medium of claim 13, wherein the data store is:

a database and the data is one or more database records; or an object store accessible to a plurality of threads, and wherein the data is one or more mutable objects.

* * * * *

UNITED STATES PATENT AND TRADEMARK OFFICE
CERTIFICATE OF CORRECTION

PATENT NO. : 10,055,448 B2
APPLICATION NO. : 14/675456
DATED : August 21, 2018
INVENTOR(S) : Pottlapelli et al.

Page 1 of 1

It is certified that error appears in the above-identified patent and that said Letters Patent is hereby corrected as shown below:

In the Specification

In Column 9, Lines 57-58, delete "networking" and insert -- networking. --, therefor.

Signed and Sealed this
Sixteenth Day of July, 2019

Andrei Iancu
*Director of the United States Patent and Trademark Office*